US006978160B2

(12) United States Patent
Hutchison et al.

(10) Patent No.: US 6,978,160 B2
(45) Date of Patent: Dec. 20, 2005

(54) TWO PART PORTABLE TELEPHONE CONFIGURED TO BE WORN ABOUT THE PERSON

(75) Inventors: Mark Hutchison, Headley (GB); Brian Davidson, Woking (GB)

(73) Assignee: Nokia Corporation (FI)

( * ) Notice: Subject to any disclaimer, the term of this patent is extended or adjusted under 35 U.S.C. 154(b) by 286 days.

(21) Appl. No.: 10/043,109

(22) Filed: Jan. 14, 2002

(65) Prior Publication Data

US 2002/0103014 A1 Aug. 1, 2002

(30) Foreign Application Priority Data

Jan. 22, 2001 (GB) ............................................ 0101572

(51) Int. Cl.[7] ................................................ H04M 1/00
(52) U.S. Cl. .................. 455/573; 455/575.1; 455/575.6
(58) Field of Search ........................... 455/575.1, 575.6, 455/550.1, 573, 572, 90.3, 575.2; 320/108, 119, 103, 112, 113, 116, 118

(56) References Cited

U.S. PATENT DOCUMENTS

| | | | | |
|---|---|---|---|---|
| 5,889,737 A | * | 3/1999 | Alameh et al. | 368/204 |
| 6,006,116 A | * | 12/1999 | Vermeer | 455/572 |
| 6,043,626 A | * | 3/2000 | Snyder et al. | 320/113 |
| 6,158,884 A | | 12/2000 | Lebby et al. | |
| 6,192,253 B1 | * | 2/2001 | Charlier et al. | 455/575.7 |
| 6,275,681 B1 | * | 8/2001 | Vega et al. | 455/41.1 |
| 6,473,630 B1 | * | 10/2002 | Baranowski et al. | 455/572 |
| 6,522,902 B2 | * | 2/2003 | Nishihara et al. | 455/574 |

FOREIGN PATENT DOCUMENTS

| | | |
|---|---|---|
| CN | 1128474 A | 8/1996 |
| DE | 43 19 763 A1 | 10/1994 |
| DE | 198 03 02 C1 | 8/1999 |
| DE | 198 03 602.7-31 | 8/1999 |
| EP | 0688082 | 6/1995 |
| EP | 0 829 992 A2 | 3/1998 |
| GB | 2 302 232 | 1/1997 |
| GB | 2 343 580 | 5/2000 |
| GB | 2 357 653 | 6/2001 |
| JP | 2001-103538 | 4/2001 |
| WO | WO 9827702 A2 * | 6/1998 |
| WO | WO 98/27702 | 6/1998 |
| WO | 98/27702 | 6/1998 |

OTHER PUBLICATIONS

European Search Report.

* cited by examiner

*Primary Examiner*—Vivian Chin
*Assistant Examiner*—Lewis West
(74) *Attorney, Agent, or Firm*—Antonelli, Terry, Stout and Kraus, LLP

(57) ABSTRACT

A portable telephone assembly comprising first and second portions is disclosed. The first portion comprises a primary power source, is independently operable as a portable telephone and is arranged to be detachably connectable to the second portion. The second portion is arranged to be removably attachable to a user and comprises an auxiliary power source operable to supplement the primary power source when the first and second portions are connected.

7 Claims, 4 Drawing Sheets

TWO PART PORTABLE TELEPHONE CONFIGURED TO BE WORN ABOUT THE PERSON

BACKGROUND OF THE INVENTION

1. Field of the Invention

This invention relates to a two-part mobile telephone configured to be worn about the person, particularly in the manner of a wristwatch.

2. Description of the Prior Art

Portable telephones have become ever smaller and lighter since portable telephones first became widely available for use by the general public. Current portable telephones are very compact and lightweight, and manufacturers are keen to develop telephones which are considered personal accessories, to be carried or worn about the person, rather than separate articles which can be more easily misplaced.

Part of the inspiration for the present invention came from the realization that people are generally accustomed to wearing a watch, and do not generally object to wearing one all day, every day. Indeed, many watches, particularly of the diving or chronograph type, can weigh considerably more than many of the more recent portable telephones. For instance, the Nokia® 8890 telephone weighs 91 g and has a volume of 70 cc, whereas a typical sports or diving watch can weigh well over 100 g. The weight of such watches is often regarded as a sign of quality.

The majority of the weight of such sports watches may be made up of the metalwork of the strap and casing. If the weight of such watches can be capitalized upon, and used instead for functioning circuitry, a telephone can be constructed which the user can wear around his wrist, in the manner of a watch, without noticing any appreciable difference in weight compared with a regular watch.

A wrist-mounted portable telephone is disclosed in co-assigned patent GB 2317300B. In this case, a telephone element 5 is arranged to be detached from a wrist band 2, allowing the user to use the detachable element in the same manner as a regular telephone.

A problem with such an apparatus is the limited volume available in the telephone element 5 itself. The only space available for the battery is in the main body 7 of the telephone 5. Such limited volume restricts the capacity of the battery, which is generally the single bulkiest component of a portable telephone. A limited battery capacity in turn impacts upon the time for which the telephone may be used between charging cycles, causing inconvenience to the user by the frequency of re-charges which are necessary to maintain the telephone in functioning order.

SUMMARY OF THE INVENTION

For a better understanding of the present invention, and to understand how the same may be brought into effect, the invention will now be described, by way of example only, with reference to the appended drawings in which: According to the present invention, there is provided a portable telephone assembly comprising first and second portions wherein the first portion: comprises a primary power source; is independently operable as a portable telephone; and is arranged to be detachably connectable to the second portion, and the second portion: is arranged to be removably attachable to a user; and comprises an auxiliary power source operable to supplement the primary power source when the first and second portions are connected.

DETAILED DESCRIPTION OF THE INVENTION

Figure 1:
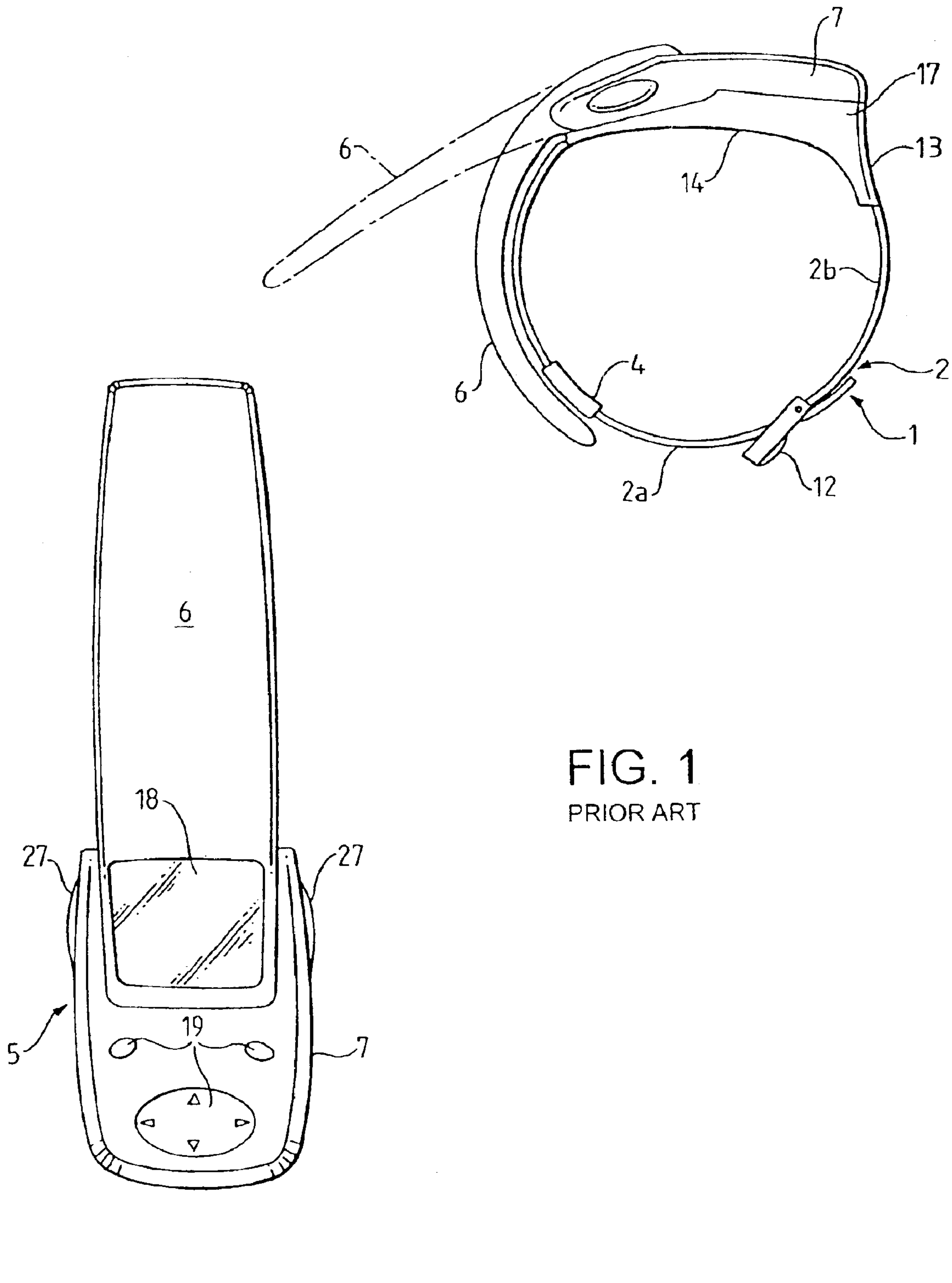
FIG. 1 shows a prior art wrist-mounted telephone.
Figure 2:
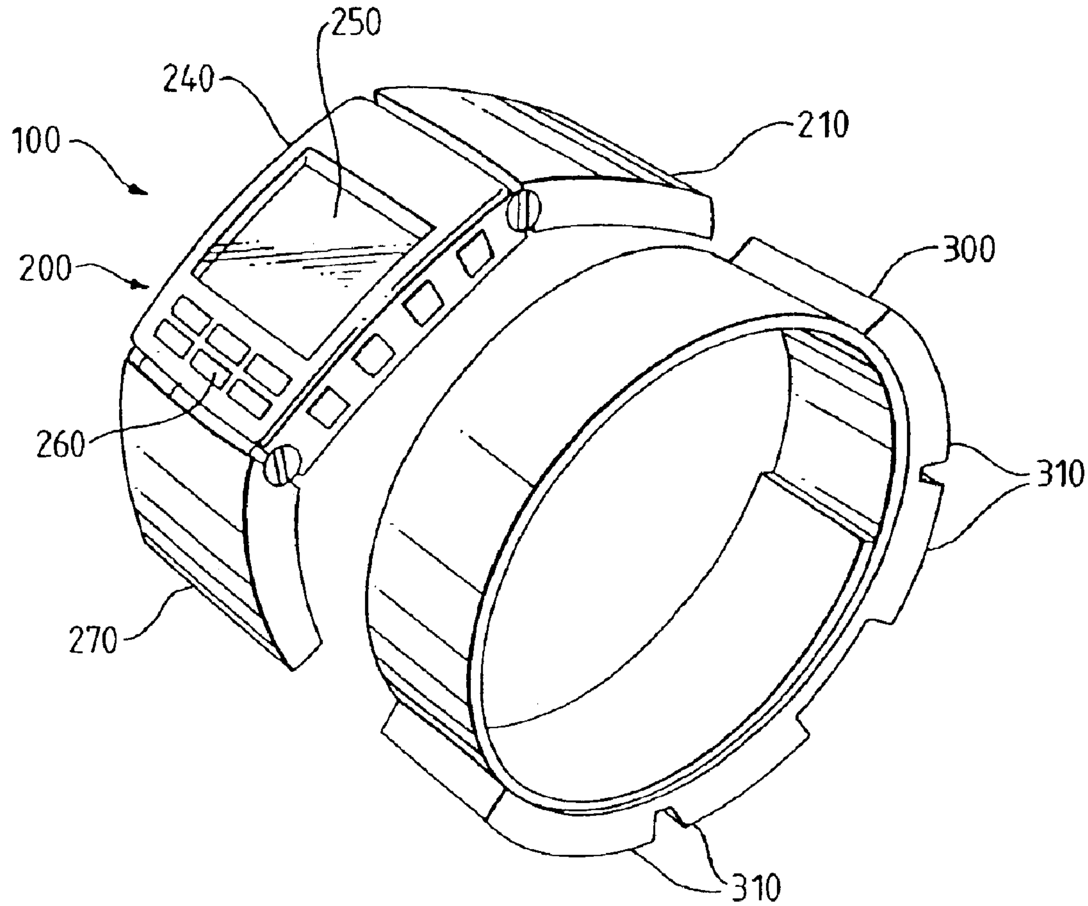
FIG. 2 shows an exploded view of a telephone apparatus according to an embodiment of the present invention.

FIG. 2 shows an exploded view of a wrist-mounted telephone apparatus 100 according to an embodiment of the invention. The telephone apparatus 100 comprises two parts: a detachable telephone part 200, and a strap or bracelet-like part 300 for attachment to a user's wrist.

The telephone part 200 is shown separate from the strap part 300 for clarity. In reality, in the configuration shown, it would be located flush against the strap 300. The telephone part 200 comprises all the circuitry and elements normally associated with a portable radio telephone as are known. The telephone part comprises three major portions: an upper portion 210, a central portion 240 and a lower portion 270.

A microphone element is positioned in the lower portion 270. A battery (not shown in FIG. 2) is positioned in the lower portion also. An earpiece and antenna are positioned in the upper portion 210. The central portion 240 accommodates the bulk of the circuitry of the telephone, including a display 250, and a number of user-operable input keys 260. The keys are for controlling the operation of the telephone, and may be disposed on the front surface, as well as along one or more edges of the telephone 200.

When not in use, the telephone part 200 attaches firmly to the strap part 300. In order to use the telephone, the user operates the release mechanism to free the telephone from the strap. The release mechanism can take many forms, and its exact operation is not critical to the operation of the invention.

For instance, a release mechanism similar to that described in the aforementioned Patent GB 2317300B could be used. The mechanism therein described comprises two user-operable release latches which are situated on opposing edges of the telephone. The latches are arranged to engage with complementary parts on the bracelet and so lock the telephone to the bracelet. To remove the telephone part, the user simply squeezes the two latches, which unlocks the telephone and allows it to be removed from the bracelet. To re-attach the telephone, the user simply snaps the telephone back into position, and so reengages the latches.

Alternative arrangements are possible, and will depend on the exact design chosen for the apparatus. For instance, some form of press-stud or snap-fit arrangement can be used.

Due to the telephone part 200 being limited in size, by virtue of having to be accommodated on a wrist strap, it is difficult to provide a battery of sufficient capacity to provide a level of operational and standby time which will be comparable with that offered by regular telephones. Users now expect their telephones to offer standby times of several days.

In the apparatus 100 disclosed here, the independently operable telephone part 200 contains a primary battery 280, positioned in the lower portion 270. This operates to provide the power for all the functions of the telephone part, but due to its necessarily small size, and hence relatively low power capacity, it can prove difficult to provide an operational or standby time which will meet the user's expectations.

To address this problem, the strap part 300, which remains attached to the user's wrist, is provided with a secondary power source (see FIG. 4), which is operable to supplement the power of the primary source. The power in the telephone's primary battery is supplemented by using the secondary power source to recharge the battery 280 in the telephone.

The secondary, or auxiliary, power source comprises a number of battery cells 315 which are electrically connected together and disposed in the enlarged portions 310 of the strap 300. The cells are connected together in the required number to make up a battery of the required capacity and voltage.

Any type of rechargeable battery cell is suitable for use in this application. Typical types of battery technology include Lithium-ion (Li-ion) and Nickel Metal Hydride (NiMH).

When the telephone part 200 is attached to the strap part 300, electrical connection between the primary and auxiliary power sources is effected via two contacts on the telephone part and mating contacts on the strap part. Of course, these need not use direct electrical connection and may be implemented in any way that allows a charging connection to be established. For instance, contactless charging by inductive means may be used as described below.

Associated with the primary power source is a charging circuit which charges the primary power source using power derived from the auxiliary power source. The charging circuit may be disposed in either the telephone part 200 or the strap part 300.

Through use of the charging connections, or other detection means, it is possible for the charging circuitry to establish when the telephone part 200 is attached to the bracelet 300. If attachment is detected, the voltage or other status of the primary power source 280 is measured and, if below a defined threshold, charging is initiated.

Through use of such an auxiliary power source, the primary power source 280 in the telephone part 200 may be kept to an acceptable size, while still being easily re-chargeable from a conveniently located source, that is the strap 300, forms part of the usual means of carrying the telephone part.

Figure 3:
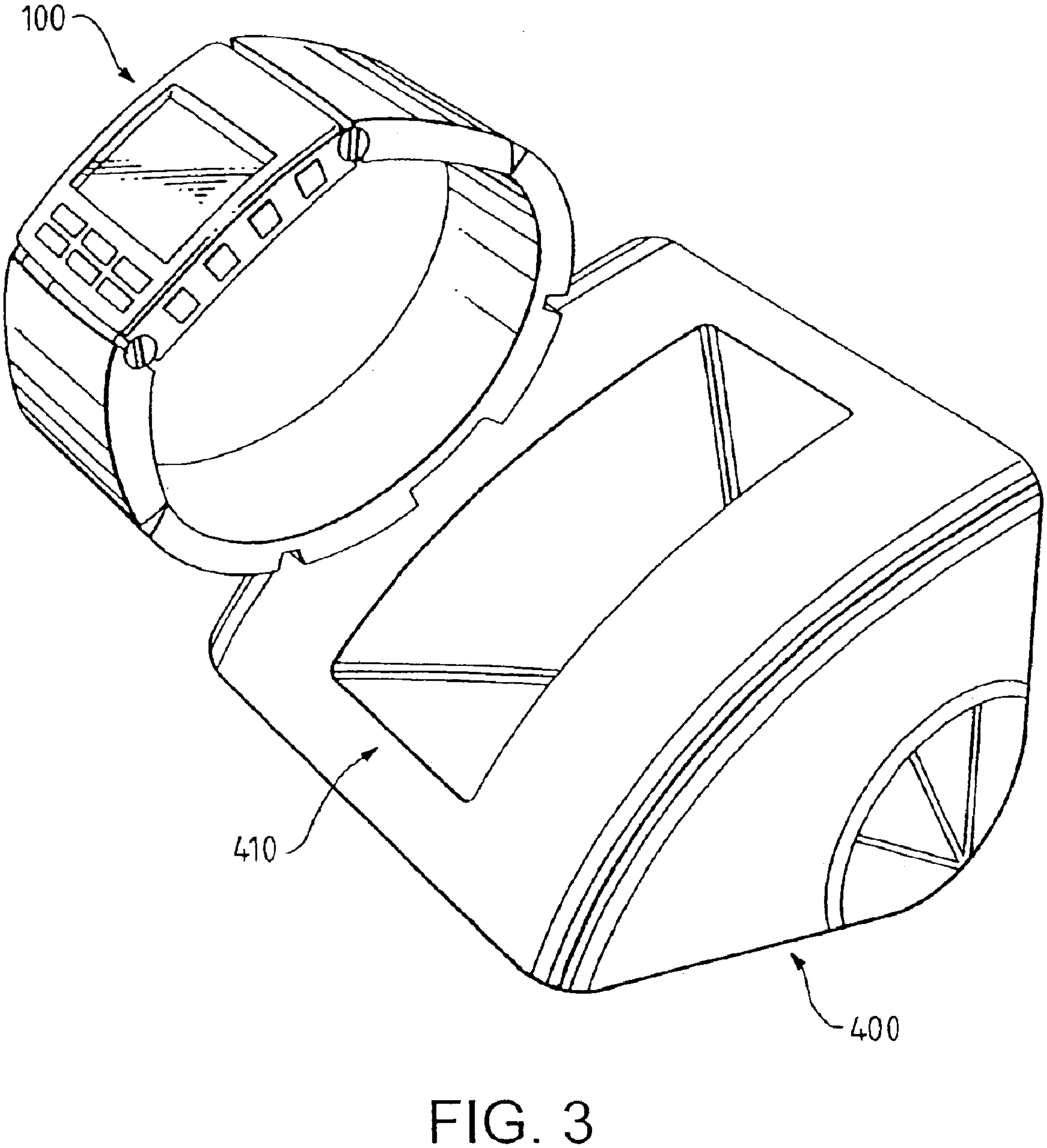
FIG. 3 shows a charger for use with the telephone apparatus of FIG. 2.

Of course, it will be necessary to periodically charge the secondary power source periodically. To that end, a bedside charger apparatus 400 is disclosed in FIG. 3.

Charger 400 connects to the normal domestic mains AC power supply (110V to 240V depending on location). It is primarily designed to be located at the user's bedside so that when the wrist mounted assembly 100 is removed at night, it can be inserted into slot 410 of charger 400 to re-charge the secondary power source overnight.

Connection between the secondary power source and the charger 400 can be effected through the direct electrical connection, as is normal in currently available telephone charger arrangements. For instance, two conductive contacts could be disposed on a region of the bracelet 300. These contacts would connect internally with the secondary power source 315. Two sprung complementary contacts would then be provided in the slot 410 of the charger so that when the telephone 100 is inserted, the charging circuit is completed and the secondary power source can be charged.

However, it may not always be desirable to provide a direct electrical connection between the secondary power source and the charger. An alternative and preferred charging technique relies on an inductive coupling between the charger and the secondary power source.

Figure 4:
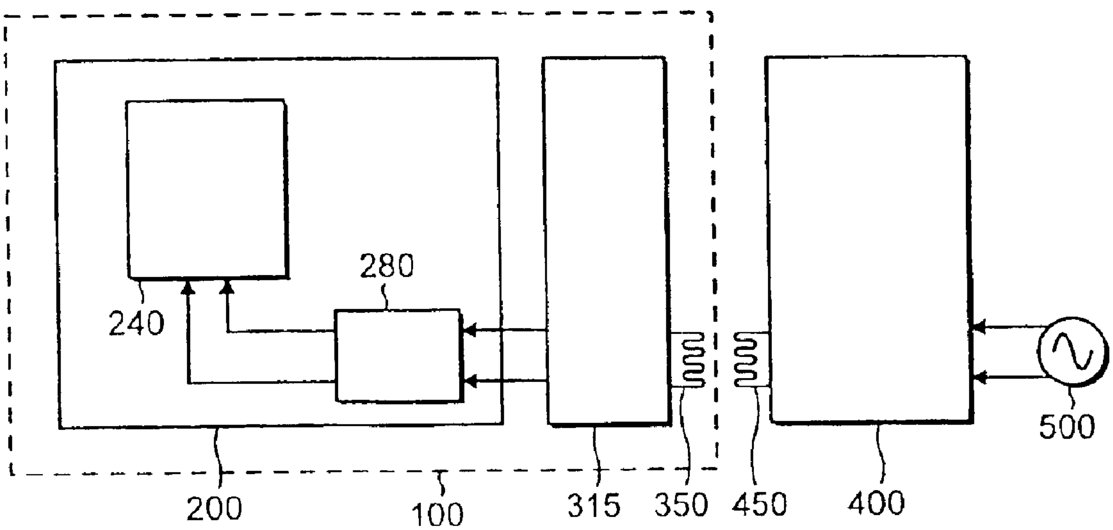
FIG. 4 shows a schematic illustration of the power connections associated with embodiments of the invention.

This configuration is shown in FIG. 4. Charger 400 is connected to the mains AC supply 500. Charger 400 is equipped with a primary coil 450 of a transformer which is used to couple energy from the mains supply 500 to the secondary DC power source 315 via secondary coil 350.

When the telephone 100 is inserted into the charger 400, the two halves of the transformer 350, 450 are disposed adjacent one another, and so energy is inductively coupled from the primary coil 450 to the secondary coil 350, and so to the charging circuit forming part of the secondary power source 315.

The secondary coil 350 can be disposed as a planar coil located just beneath the outer surface of one of the enlarged portions 310 of the bracelet part 300. The primary coil can then be located at the rear of the slot 410 of the charger so that when the telephone 100 is inserted, the two coils lie adjacent one another, thus ensuring maximum transfer of energy.

FIG. 4 also shows the power connections between the secondary source 315 and the primary source 280. These are shown as direct electrical connections, although these too could be implemented as an inductive coupling as previously described.

In the light of the foregoing description, it will be clear to the skilled man that various modifications may be made within the scope of the invention.

The present invention includes any novel feature or combination of features disclosed herein either explicitly or any generalization thereof irrespective of whether or not it relates to the claimed invention or mitigates any or all of the problems addressed.

What is claimed is:

1. A portable telephone assembly comprising:

first and second portions; and wherein the first portion comprises a primary power source for providing power for all functions of the telephone, is arranged to be detachably connectable to the second portion and is independently operable as a portable telephone when detached from the second portion;

the second portion is arranged to be removably attachable to a user and comprises a battery operable to recharge the primary power source when the first and second portions are connected; and the battery comprises re-chargeable cells distributed about the second portion wherein the primary power source is for providing power for all of the functions of the telephone whether or not the second portion is attached to the first portion.

2. A portable telephone assembly as claimed in claim 1, wherein: the second portion is removably attachable to a user's wrist.

3. A portable telephone assembly as claimed in claim 1 wherein:

charging circuitry is provided to re-charge the primary power source from the battery.

4. A portable telephone assembly as claimed in claim 3, wherein:

the charging circuitry is disposed in the second portion.

5. A portable telephone assembly as claimed in claim 3, wherein:

the charging circuitry comprises contactless inductive charging apparatus.

6. A portable telephone assembly as claimed in claim 4, wherein:

the charging circuitry comprises contactless inductive charging apparatus.

7. A portable telephone apparatus as claimed in claim 1, comprising:

charging apparatus for re-charging the battery.

* * * * *